US011111091B2

United States Patent
Morrish et al.

(10) Patent No.: US 11,111,091 B2
(45) Date of Patent: Sep. 7, 2021

(54) RAMP STRUCTURE

(71) Applicant: Enable Access (Holdings) Limited, Hatfield (GB)

(72) Inventors: Gerald David Morrish, Hertfordshire (GB); Kenneth George Morrish, Hertfordshire (GB)

(73) Assignee: Enable Access (Holdings) Limited, Hatfield (GB)

( * ) Notice: Subject to any disclaimer, the term of this patent is extended or adjusted under 35 U.S.C. 154(b) by 193 days.

(21) Appl. No.: 16/354,982

(22) Filed: Mar. 15, 2019

(65) Prior Publication Data

US 2019/0283986 A1    Sep. 19, 2019

(30) Foreign Application Priority Data

Mar. 15, 2018  (GB) ..................................... 1804185

(51) Int. Cl.
| | | |
|---|---|---|
| *B65G 69/30* | (2006.01) | |
| *B65G 69/28* | (2006.01) | |
| *E04F 11/00* | (2006.01) | |
| *A61G 3/06* | (2006.01) | |

(52) U.S. Cl.
CPC ............. *B65G 69/30* (2013.01); *A61G 3/061* (2013.01); *B65G 69/287* (2013.01); *E04F 11/002* (2013.01)

(58) Field of Classification Search
CPC ...... B65G 69/30; B65G 69/287; A61G 3/061; E04F 11/002
See application file for complete search history.

(56) References Cited

U.S. PATENT DOCUMENTS

| | | | | |
|---|---|---|---|---|
| 3,088,568 A | * | 5/1963 | Troy | ..................... B65G 69/30 193/38 |
| 3,517,791 A | * | 6/1970 | Miles | ........................ B60P 1/43 193/41 |
| 5,347,672 A | * | 9/1994 | Everard | .................. A61G 3/061 14/69.5 |
| 5,538,308 A | * | 7/1996 | Floe | ........................ B60P 1/435 296/61 |
| 6,389,629 B1 | * | 5/2002 | Schouest | ................... B60P 1/43 119/849 |
| 6,536,064 B1 | * | 3/2003 | Swink | ..................... B60P 1/431 14/69.5 |
| 7,043,789 B2 | * | 5/2006 | Morrish | .................. A61G 3/061 14/69.5 |
| 7,100,231 B2 | * | 9/2006 | Peschmann | ............ B65G 69/30 14/24 |

(Continued)

FOREIGN PATENT DOCUMENTS

| | | | | |
|---|---|---|---|---|
| CN | 20724546 U | | 4/2018 | |
| GB | 819972 A | * | 9/1959 | ............. B65G 69/30 |

(Continued)

*Primary Examiner* — Thomas B Will
*Assistant Examiner* — Katherine J Chu
(74) *Attorney, Agent, or Firm* — Lowe Graham Jones PLLC (57) ABSTRACT

A ramp kerb, for supporting a transverse edge of a ramp surface and a ramp lip extension having an attachment portion, comprises a first longitudinally extending channel open at an inner transverse edge of the ramp kerb for receiving a transverse edge of the ramp surface and a second longitudinally extending channel open at the inner transverse edge of the ramp kerb for receiving an attachment portion of the ramp lip extension. The first and second longitudinally extending channels are vertically spaced.

17 Claims, 11 Drawing Sheets

(56) References Cited

U.S. PATENT DOCUMENTS

| | | | | |
|---|---|---|---|---|
| 7,179,042 B1* | 2/2007 | Hartmann | | B65G 69/30 |
| | | | | 14/69.5 |
| 7,350,843 B2* | 4/2008 | Meyers | | B60P 1/43 |
| | | | | 14/69.5 |
| 7,526,826 B2* | 5/2009 | Bailie | | B65G 69/30 |
| | | | | 14/69.5 |
| 7,571,507 B2* | 8/2009 | Holicki | | A61G 5/104 |
| | | | | 14/69.5 |
| 7,661,171 B2* | 2/2010 | Gang | | B65G 69/30 |
| | | | | 14/69.5 |
| 7,950,094 B2* | 5/2011 | Bailie | | B65G 69/30 |
| | | | | 14/69.5 |
| 8,191,193 B2* | 6/2012 | Bailie | | B60P 1/43 |
| | | | | 14/69.5 |
| 8,813,289 B1* | 8/2014 | Clark | | E04F 11/002 |
| | | | | 14/69.5 |
| 8,914,932 B2* | 12/2014 | Romanak | | B65G 69/30 |
| | | | | 14/69.5 |
| 10,207,881 B2* | 2/2019 | Deshpande | | B65G 69/2876 |
| 10,471,901 B2* | 11/2019 | Stojkovic | | B60R 11/06 |
| 2002/0144364 A1 | 10/2002 | Anderson et al. | | |
| 2005/0015899 A1* | 1/2005 | Jeruss | | B65G 69/287 |
| | | | | 14/69.5 |

FOREIGN PATENT DOCUMENTS

| | | |
|---|---|---|
| JP | 2010089586 A | 4/2010 |
| JP | 2011131808 A | 7/2011 |
| JP | 2015019993 A | 2/2015 |
| JP | 2015193991 A | 11/2015 |

* cited by examiner

RAMP STRUCTURE

FIELD OF INVENTION

The present invention relates to a ramp structure and ramp components. The invention is of particular, but not exclusive, use in access ramps for enabling wheelchair/pushchair users to move a wheelchair/pushchair up a step or steps, or into or out of a vehicle.

BACKGROUND

It is known to use ramps to facilitate access e.g. for people in wheelchairs, people with mobility impairments, or people pushing pushchairs/prams, into buildings having one or more step at the entrance. It is also known to use ramps to facilitate access e.g. for people in wheelchairs or for people with goods on trolleys into the back of vehicles.

Portable ramps which can be placed at the entrance (or at the back of a vehicle) and then removed and stored at an alternative location are known. They typically comprise a ramp surface (over which the user can pass from a first lateral end to a second (higher or lower) lateral end) having transverse edges held between two ramp kerbs. In order to facilitate an easy transition onto or off from the ramp surface, the known ramps are typically provided with ramp lip extensions which extend from the lateral end(s) of the ramp surface to contact the ground.

Figure 1A:
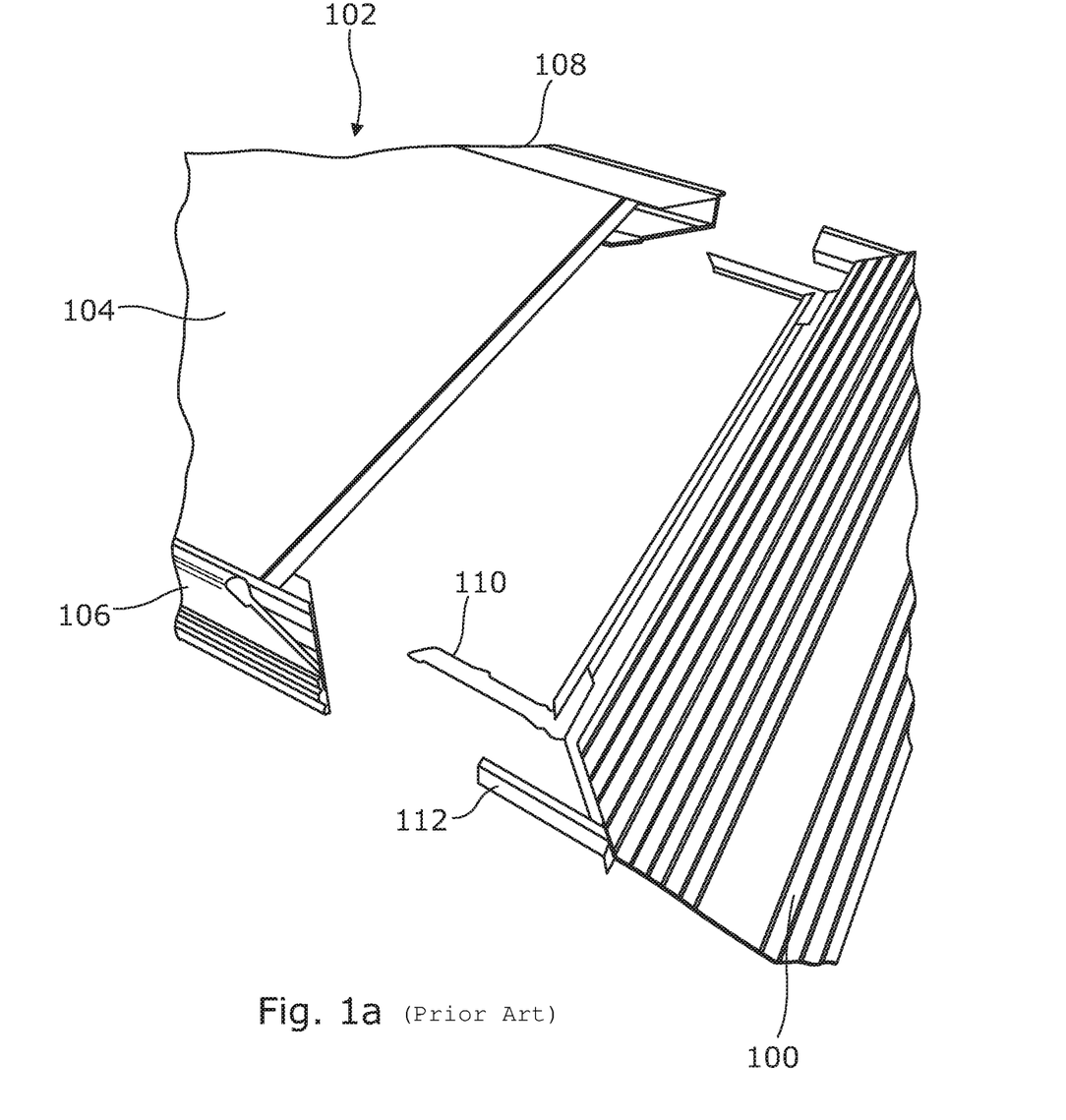
FIG. 1a illustrates a partial exploded view of a known ramp lip extension for attachment to ramp.
Figure 1B:
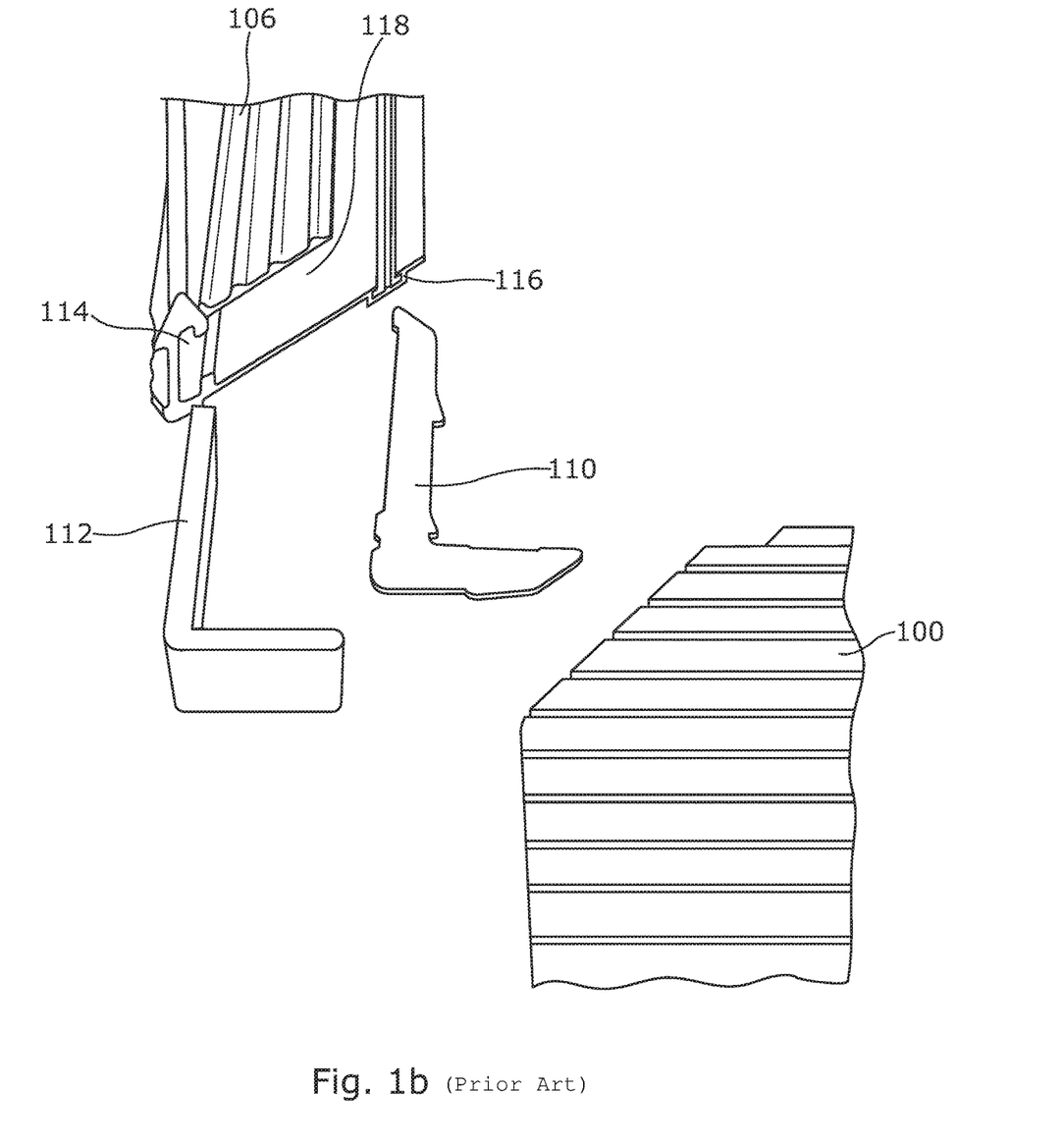
FIG. 1b illustrates a further partial exploded view of a known ramp lip extension for attachment to a ramp.

FIGS. 1a and 1b show a known ramp lip extension 100 for attachment to ramp 102.

Ramp 102 comprises a ramp surface 104 having transverse edges supported within channels 118 on ramp kerbs 106, 108. Ramp lip extension 100 is attached to ramp kerbs 106, 108 by two horizontal attachment elements 110 which are inserted into horizontal channels 116 and two outer attachment elements 112 which are inserted into vertical channels 114 on each ramp kerb 106, 108.

One problem with this known ramp structure is that manufacture of the ramp entails manufacture (e.g. cutting and shaping) of the attachment elements 110, 112 (which is time consuming and costly). Connection of the attachment elements to the lip extension and then connection of the lip extension and ramp structure to the ramp kerbs is also time consuming, and therefore costly.

The present invention aims to provide a ramp structure that is more easily manufactured and is less costly to produce.

SUMMARY OF INVENTION

In a first aspect, the present invention provides a ramp kerb for supporting a transverse edge of a ramp surface and a ramp lip extension having an attachment portion, said ramp kerb comprising a first longitudinally extending channel open at an inner transverse edge of the ramp kerb for receiving a transverse edge of the ramp surface and a second longitudinally extending channel open at the inner transverse edge of the ramp kerb for receiving an attachment portion of the ramp lip extension, wherein said first and second longitudinally extending channels are vertically spaced.

Unlike known ramp kerbs, the ramp kerb of the first aspect has two vertically spaced longitudinally extending channels open at an inner transverse edge of the ramp kerb, for attachment to a ramp surface and a ramp lip extension. This structure has a simple cross-section (i.e. when viewed in the longitudinal direction, from a lateral end of the ramp kerb), and can therefore be easily manufactured with a simple single-step manufacturing process, e.g. extrusion. Because the two longitudinally extending channels are open at the inner transverse edge of the ramp kerb, assembly of the ramp is simple and fast. The cost-per-unit of the ramp kerb is therefore low.

Used herein, 'longitudinal' or 'longitudinally' in relation to the ramp kerb means in a length-wise direction i.e. in the direction of elongation of the ramp kerb. This will be in the direction parallel to the direction of travel along the ramp surface by a user, i.e. from a first lateral end of the ramp surface to a second (higher or lower) lateral end of the ramp.

References herein to 'transverse' mean a direction perpendicular to the longitudinal axis of the ramp or ramp kerb, and 'transverse edge' means an edge extending in the longitudinal direction.

References herein to an inner transverse edge of the ramp kerb are to the edge of the ramp kerb which faces inwards, i.e. towards the ramp kerb and ramp lip extension, during use. Analogously, references to the outer transverse edge of the ramp (which opposes the inner transverse edge) are to the edge of the ramp that faces outwards, i.e. away from the ramp kerb and ramp lip extension, during use.

References herein to a vertical direction in the context of the ramp structure/ramp kerb mean a vertical direction when the ramp structure/ramp kerb is laid horizontally. In other words, the vertical direction in the context of the present invention is the direction normal to an upper face of the ramp surface, along which a user travels during use. Analogously, references herein to a horizontal direction in the context of the present invention mean in a direction parallel to an upper face of the ramp surface.

Optional features of the first aspect are described below.

The first longitudinally extending channel may extend along an entire length of the ramp kerb, between opposing lateral ends of the ramp kerb. Preferably, the first longitudinally extending channel is open at both lateral ends of the ramp kerb (as well as at the inner transverse edge of the ramp kerb).

The second longitudinally extending channel may extend along an entire length of the ramp kerb, between opposing lateral ends of the ramp kerb. Preferably, the second longitudinally extending channel is open at both lateral ends of the ramp kerb (as well as at the inner transverse edge of the ramp kerb).

The ramp kerb may include a longitudinally extending spine at the outer transverse edge. The spine may provide a base of the first longitudinally extending channel, and a base of the second longitudinally extending channel.

A base of the first longitudinally extending channel may be coaligned with a base of the second longitudinally extending channel, i.e. coaligned when viewed along the longitudinal axis of the ramp kerb. Accordingly, the ramp kerb can receive a ramp surface and ramp lip extension with the same lateral dimension (width) as each other.

The base of the first longitudinally extending channel may alternatively be offset from the base of the second longitudinally extending channel, i.e. offset when viewed along the longitudinal axis of the ramp kerb. For example, the base of the first longitudinally extending channel may be recessed relative to the base of the second longitudinally extending channel. Alternatively, the base of the second longitudinally extending channel may be recessed relative to the base of the first longitudinally extending channel. Accordingly, the ramp kerb can receive a ramp surface and ramp lip extension with different lateral dimensions (widths).

The first longitudinally extending channel may be deeper than the second longitudinally extending channel, i.e. it may have a greater vertical dimension.

An elongated upper web may define the upper surface of the first longitudinally extending channel.

An elongated lower web may define the lower surface of the second longitudinally extending channel.

Preferably, the upper and lower webs are parallel, i.e. so that the upper surface of the first longitudinally extending channel is parallel with the lower surface of the second longitudinally extending channel.

The inner transverse edge of the first longitudinally extending channel may be coaligned with the inner transverse edge of the second longitudinally extending channel. In other words, the upper web may have a lateral dimension (width) matching that of the lower web.

The first and second longitudinally extending channels may be joined, i.e. there may be no central web separating them. In such embodiments, the base of the second longitudinally extending channel may be offset from the base of the first longitudinally extending channel, e.g. by a step adjacent the lower elongated web.

Alternatively, the first and second longitudinally extending channels may be separated by an elongated central web, the central web providing the upper surface of the second longitudinally extending channel, and the lower surface of the first longitudinally extending channel.

Preferably the upper, lower and central webs are parallel, i.e. so that the upper and lower surfaces of the first longitudinally extending channel are parallel and the upper and lower surfaces of the second longitudinally extending channel are parallel.

The upper web may have a lateral dimension (width) matching that of the central web. The lower web may have a lateral dimension (width) matching that of the central web. In alternative embodiments, the lower web has a lateral dimension (width) that is less than that of the central web.

Advantageously, the upper and/or lower surface defining the first longitudinally extending channel may comprise at least one indentation e.g. a longitudinally extending indentation for receiving a respective projection e.g. a respective longitudinally extending projection depending from the upper and/or lower surface of the ramp surface.

In other embodiments, the upper and/or lower surface defining the first longitudinally extending channel may comprise at least one projection e.g. a longitudinally extending projection for housing in a respective indentation e.g. a respective longitudinally extending indentation formed in the upper and/or lower surface of the ramp surface.

The ramp kerb may include a longitudinally extending upstanding rail providing a safety barrier at the outer transverse edge of the ramp kerb, e.g. for preventing a wheelchair from falling off the transverse edge of the ramp (when assembled). The upstanding rail may extending upwards from the longitudinally extending spine.

The ramp kerb may include a longitudinal hinge leaf at the outer transverse edge of the ramp kerb (typically at an outer transverse edge of the longitudinally extending spine) for pivotal attachment to a longitudinal hinge leaf of an adjacent ramp kerb. The hinge leaves of two adjacent ramp kerbs may then be assembled to collectively form any known form of hinge (e.g. 3-part hinge (with a separate connection element), butt hinge, barrel hinge, piano hinge, etc.), extending in the longitudinal direction between the two ramp kerbs. The hinge leaf/leaves may be formed integrally with the ramp kerb, or alternatively may be secured within a slot in the outer transverse edge of the ramp kerb/longitudinally extending spine. The ramp kerbs can then be used to pivotally join together separate ramp surfaces.

The ramp kerb may include a textured, e.g. ridged and/or roughened upper surface, i.e. to prevent slipping of a wheelchair/pushchair/user on the ramp kerb. The texturing may be provided by a textured, e.g. ridged and/or roughened self-adhesive layer applied to the upper surface.

The ramp kerb may be formed as/from a single piece. In other words, the ramp kerb may be of unitary construction. Preferably, the ramp kerb is formed by extrusion. Advantageously, the ramp kerb may be formed by a single-step extrusion process.

In a second aspect, the present invention provides a ramp lip extension comprising a lip surface (e.g. an inclined lip surface) having transverse edges spaced by an uppermost lateral end and a lowermost lateral end, and an attachment portion for attachment to a ramp kerb, said attachment portion comprising a downwardly depending skirt depending from the uppermost lateral end of the lip surface and a projection projecting from said skirt away from said lip surface, wherein said projection is vertically spaced below said uppermost lateral end of the lip surface by said skirt.

Unlike known ramp lip extensions, the ramp lip extension of the second aspect has a simple attachment portion comprising a downwardly depending skirt and a projection. The ramp lip extension can therefore be manufactured using a simple single-step manufacturing process, e.g. extrusion. The cost-per-unit of the ramp lip extension is therefore low. To assemble a ramp, the at least one projection can be simply inserted into the second longitudinally extending channel of a ramp kerb (e.g. of the first aspect), until the downwardly depending skirt abuts a lateral end of the ramp surface. Assembly of the ramp structure is therefore simple.

Optional features of the second aspect are described below.

Preferably, the at least one projection is vertically spaced above a lowermost edge of the downwardly depending skirt. Advantageously, the at least one projection may project perpendicularly out of the skirt.

The lip surface may have a textured, e.g. ridged and/or roughened upper surface, i.e. to prevent slipping of a wheelchair/pushchair/user on the lip surface. The texturing may be provided by a textured, e.g. ridged and/or roughened self-adhesive layer applied to the upper surface.

The ramp lip extension may be formed as/from a single piece. In other words, the ramp lip extension may be of unitary construction. Preferably, it is formed by extrusion.

Advantageously, the ramp lip extension may be formed by a single-step extrusion process.

The downwardly depending skirt may extend from one transverse edge of the ramp lip extension to an opposing transverse edge of the ramp lip extension. In these embodiments, the downwardly depending skirt will have the same width as the uppermost lateral end of the lip surface.

Advantageously, the projection may be a single ridge-like projection extending from one transverse edge of the ramp lip extension to the opposing transverse edge of the ramp lip extension. In these embodiments, the projection will have the same width as the uppermost lateral end of the lip surface and the downwardly depending skirt.

The ramp lip extension may further comprise at least one reinforcing element such as at least one web or strut extending between the downwardly depending skirt and the underside of the lip surface (i.e. the surface opposing the surface over which the user passes).

Advantageously, the attachment portion of the ramp lip extension may be configured such that the lip surface forms an oblique angle with respect to the ramp kerb.

The ramp kerb (according to the first aspect), ramp lip extension (according to the second aspect), and a ramp surface may be pre-assembled in a factory to form a ramp structure.

In a third aspect, the present invention provides a ramp structure comprising: a first ramp kerb according to the first aspect; a second ramp kerb according to the first aspect; a ramp surface having transverse edges spaced by an uppermost lateral edge and a lowermost lateral edge, a first of the transverse edges of the ramp surface being received in the first longitudinally extending channel of the first ramp kerb, and a second of the transverse edges of the ramp surface being received in the first longitudinally extending channel of the second ramp kerb; and a ramp lip extension according to the second aspect, the at least one projection of the ramp lip extension being received in the second longitudinally extending channels of the first and second ramp kerbs, such that the uppermost lateral end of the lip surface is in abutment with the lowermost lateral end of the ramp surface.

The projection of the ramp lip extension may be configured to be received in the second longitudinally extending channel(s) by an interference fit. In some embodiments, the ramp lip extension may be securable within the second longitudinally extending channel(s) e.g. by an adhesive bond, mechanical join, weld, rivet(s), or screw.

The transverse edges of the ramp surface may be configured to be received in the first longitudinally extending channel of a ramp kerb by an interference fit. In some embodiments, the ramp surface may be securable within the first longitudinally extending channel by an adhesive bond, mechanical join, weld, rivet(s), or screw.

Used herein, 'interference fit' means a fit between two parts in which the external dimension of a first part is equal to, or slightly exceeds, the internal dimension of the second part, such that the first part is a tight/secure fit within the second part.

In some embodiments, the ramp structure may further comprise a first transverse edge-support element attached to a lateral end of the first ramp kerb and an adjacent (first) transverse edge of the ramp lip extension. A second transverse edge-support element may also be attached to a lateral end of the second ramp kerb, and to an adjacent (second) outer transverse edge of the ramp lip extension.

The transverse edge-support elements may each comprise a vertical plate portion. The transverse edge-support element(s) bridge(s) the ramp kerb(s) and lip extension to provide structural support and rigidity to the connection between the ramp lip extension and the ramp kerb. They may each be connected at an outer transverse edge of the lateral end of the ramp kerb to which they are attached, and at an underside of the corresponding transverse edge of the ramp lip extension.

In some embodiments, the ramp structure further comprises a second ramp lip extension according to the second aspect, the at least one projection of the second ramp lip extension being received in the second longitudinally extending channels of the first and second ramp kerbs, such that the uppermost lateral end of the lip surface is in abutment with the uppermost lateral end of the ramp surface.

A third transverse edge-support element may be attached to an uppermost lateral end of the first ramp kerb, and to an adjacent (first) outer transverse edge of the second ramp lip extension. A fourth transverse edge-support element may also be attached to the uppermost lateral end of the second ramp kerb, and to an adjacent (second) outer transverse edge of the second ramp lip extension.

Advantageously, the ramp surface of the third aspect may comprise at least one indentation e.g. a longitudinally extending indentation on its upper and/or lower surface proximal one or preferably both transverse edges of the ramp surface for receiving a respective projection e.g. a respective longitudinally extending projection depending from the upper and/or lower surface defining the first longitudinally extending channel(s) in the ramp kerbs. The interaction between the indentation(s) and projection(s) results in an interlocking engagement.

In other embodiments, the ramp surface may comprise at least one projection e.g. a longitudinally extending projection on its upper and/or lower surface proximal one or preferably both transverse edges of the ramp surface for projecting into a respective indentation e.g. a respective longitudinally extending indentation formed in the upper and/or lower surface defining the first longitudinally extending channel(s) in the ramp kerbs. The interaction between the indentation(s) and projection(s) results in an interlocking engagement.

The second ramp kerb may comprise a hinge leaf as described above for the first aspect. In these embodiments, the ramp structure may further comprise: third and fourth ramp kerbs according to the first aspect, the third ramp kerb having a hinge leaf for pivotal attachment to a hinge leaf of the second ramp kerb; a further ramp surface having transverse edges spaced by an uppermost lateral end and a lowermost lateral end, a first of the transverse edges of the further ramp surface being received in the first longitudinally extending channel of the third ramp kerb, and a second of the transverse edges of the further ramp surface being received in the first longitudinally extending channel of the fourth ramp kerb; and a further ramp lip extension according to the second aspect, the at least one projection of the further ramp lip extension being received in the second longitudinally extending channels of the third and fourth ramp kerbs, such that the uppermost lateral end of the lip surface of the further ramp lip extension is in abutment with the lowermost lateral end of the further ramp surface.

In some embodiments, the ramp structure further comprises a further second ramp lip extension according to the second aspect, the at least one projection of the second ramp lip extension being received in the second longitudinally extending channels of the first and second ramp kerbs, such that the uppermost lateral end of the lip surface is in abutment with the uppermost most lateral end of the ramp surface.

The first and fourth ramp kerbs of the ramp structure may each comprise a longitudinally extending upstanding rail, providing a safety barrier.

The ramp surface/further ramp surface may be a panel, e.g. elongate panel. The panel(s) may have a textured, e.g. ridged and/or roughened upper surface. The texturing may be provided by a textured, e.g. ridged and/or roughened self-adhesive layer applied to the panel(s). The panel(s) may be formed by extrusion.

The ramp surface/further ramp surface/panel may have a latticed/webbed internal structure, e.g. a honeycomb internal structure, thus reducing the weight of the ramp surface (and hence reducing the total weight of the ramp), while providing the required mechanical strength.

DESCRIPTION OF DRAWINGS

Embodiments of the invention are set out below in detail, with reference to the accompanying drawings, in which:

FIG. 5a shows an exploded view of a ramp structure according to an embodiment of the present invention.

FIG. 5b shows an assembled view of the ramp structure of FIG. 5a.

DETAILED DESCRIPTION

The following detailed description of embodiments of the present invention is made by way of example. On reading this disclosure, modifications of the embodiments that fall within the scope of the invention will be apparent.

Figure 2A:
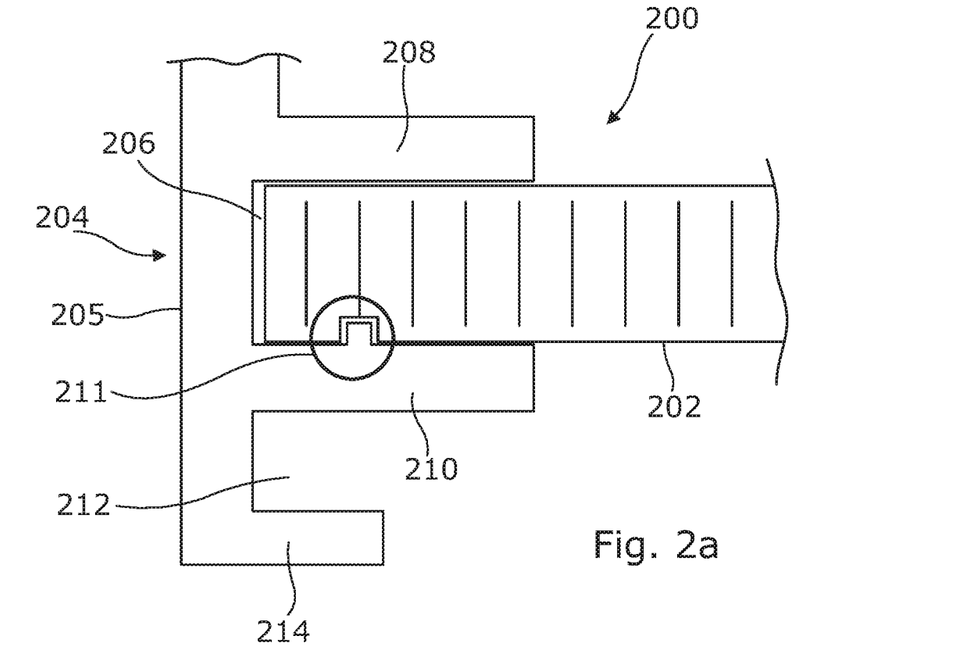
FIG. 2a shows a partial end-view of an assembled ramp kerb and ramp surface according to an embodiment of the invention.
Figure 2B:
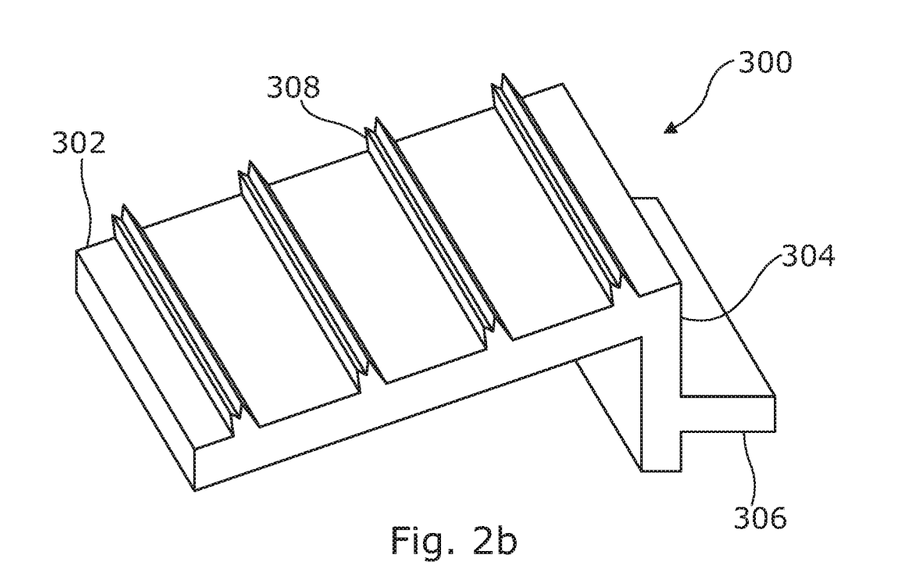
FIG. 2b shows a perspective view of a ramp lip extension according to an embodiment of the invention.
Figure 2C:
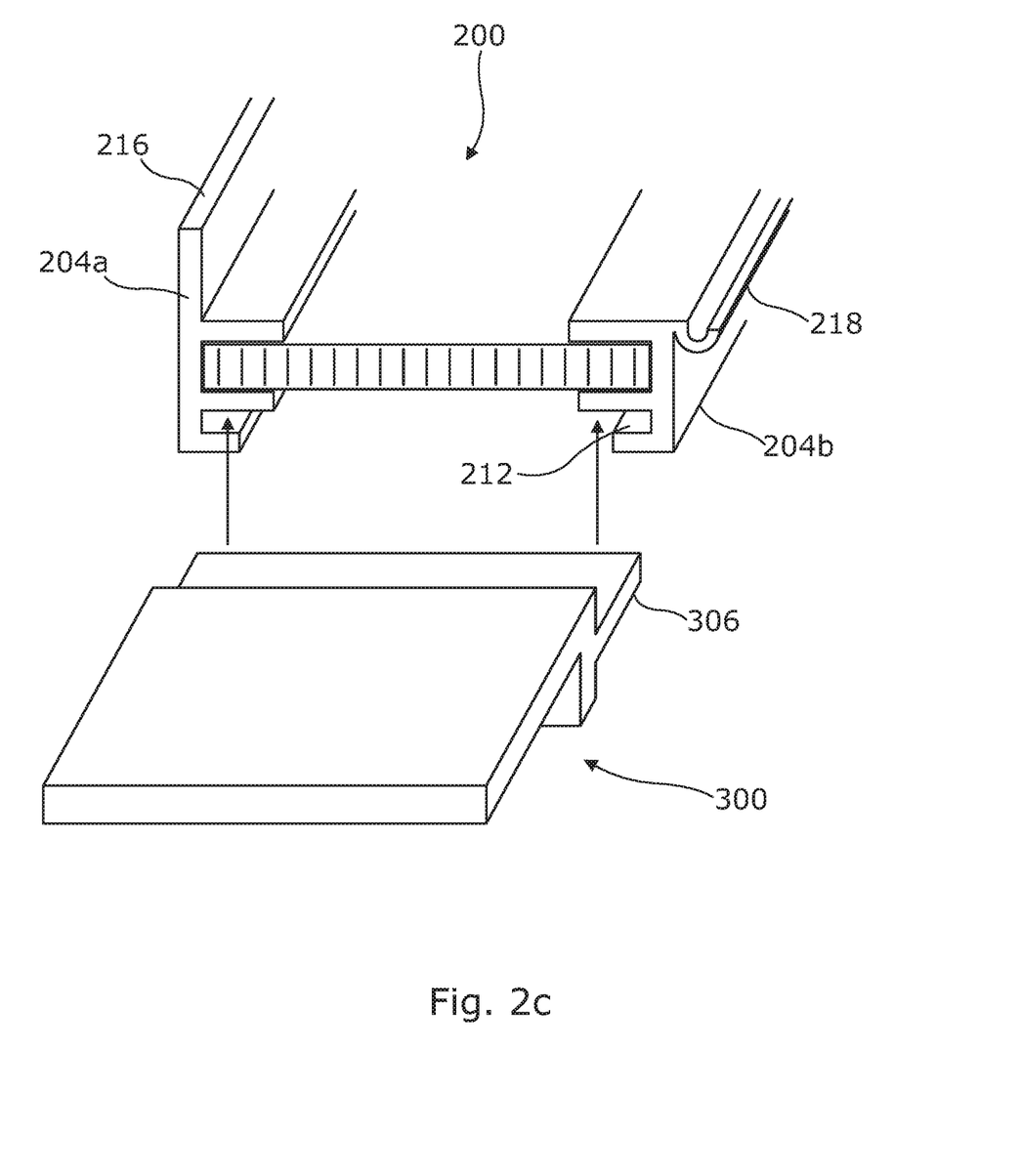
FIG. 2c shows an exploded view of a ramp structure according to an embodiment of FIG. 2a FIG. 3 shows an end-view of a ramp kerb according to an alternative embodiment of the invention.

FIGS. 2a-2c show the components of a ramp structure, ramp kerb, and ramp lip extension according to an embodiment of the present invention.

FIG. 2a shows in particular a partial end view of a ramp structure 200, including ramp surface 202 and ramp kerb 204, according to an embodiment.

Ramp kerb 204 has a first longitudinally extending channel 206 between upper and central longitudinally extending webs 208, 210, and a second longitudinally extending channel 212 between central and lower webs 210, 214. Central web 210 separates the first longitudinally extending channel from the second longitudinally extending channel. The upper, lower and central webs extend from a longitudinally extending spine 205 at the outer transverse edge of the ramp kerb. As shown, the base of the first longitudinally extending channel 206 is coaligned with the base of the second longitudinally extending channel 212.

First longitudinally extending channel 206 is configured to receive, via an interference fit, a transverse edge of ramp surface 202, as shown. Second longitudinally extending channel 212 is configured to receive, via an interference fit, a ridge-like projection of a ramp lip extension (not shown). Second longitudinally extending channel 212 is positioned below an upper surface of the ramp surface 202.

Ramp surface 202 is secured within the first longitudinally extending channel 206 of ramp kerb 204 by an interlocking engagement 211. As shown, the interlocking engagement comprises an indentation in an underside of the ramp surface 202, near a transverse edge of the ramp surface, and a corresponding protrusion on an upper surface of the central web 210, in the first channel 206. The protrusion interlocks with the indentation, preventing separation of the two parts. A similar interlocking engagement is provided at the opposing transverse edge of the ramp surface (not shown).

FIG. 2b shows in particular a ramp lip extension 300 for attachment to ramp kerb 204. Ramp lip extension 300 includes an inclined lip surface 302 configured to be positioned at the lateral end of ramp surface 202, to provide a gradual transition onto ramp surface 202. In particular, inclined lip surface 302 has an upper inclined portion configured to form an oblique angle with respect to the ramp surface 202 and ramp kerb 204, and a lower flat portion that is configured to form a substantially smooth transition to a surface on which the inclined lip surface is resting. The oblique angle is achieved by an attachment portion which comprises a downwardly depending skirt 304, and a ridge-like projection 306. When assembled, the downwardly depending skirt sits in abutment with a lateral end of the ramp surface and with a lateral end of the ramp kerb. The ridge-like projection 306 is received by second longitudinally extending channel 212, via an interference fit. Accordingly, the ramp lip extension 300 is secured to the ramp structure.

Upper surface of ramp lip extension is textured with ridges 308. These provide traction.

FIG. 2c shows an expanded view of a ramp 200 according to an embodiment of the present invention. Ramp structure 200 comprises first ramp kerb 204a, second ramp kerb 204b, ramp surface 202, and ramp lip extension 300.

The ramp surface 202 of FIG. 2c, which is an elongate panel having a ridged upper surface (not shown) and a honeycomb internal structure (not shown), is supported at both transverse edges by the first and second ramp kerbs 204a, 204b. In particular, a first transverse edge of the ramp 202 is received by the first longitudinally extending channel of the first ramp kerb 204a, and a second transverse edge of the ramp surface 202 is received by the first longitudinally extending channel of the second ramp kerb 204b, thereby supporting the ramp surface 202 from both transverse edges thereof.

Figure 4:
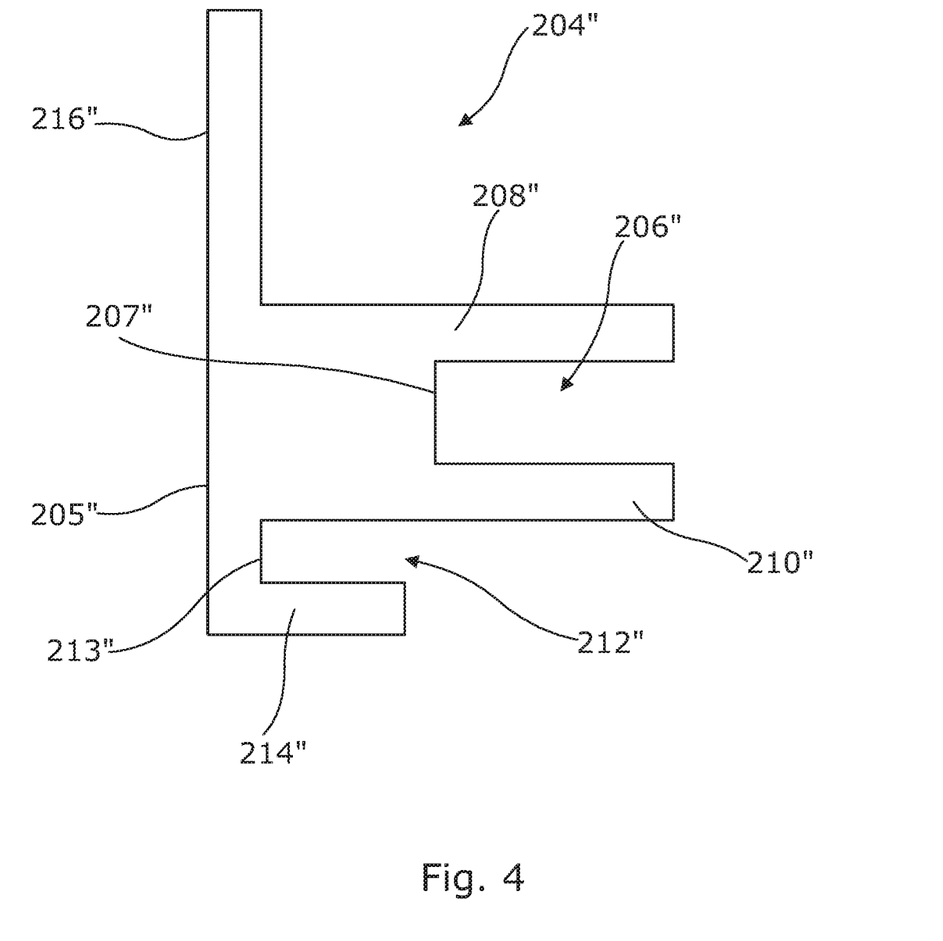
FIG. 4 shows an end-view of a ramp kerb according to another alternative embodiment of the invention.

Also shown in FIG. 2c is an upstanding rail 216 on ramp kerb 204a, for providing a raised edge to the ramp structure 200. The upstanding rail 216 prevents a user of the ramp, e.g. a wheelchair user, from falling off of an edge of the ramp. Hinge leaf 218 on ramp kerb 204b then provides capability for ramp kerb 204b to be attached to the hinge leaf of an adjacent (e.g. third) ramp kerb. Accordingly, ramp structure 200 can be pivotally attached to an adjacent ramp using hinge leaf 218. The resulting (foldable) ramp structure includes two ramp surfaces, and a geometrically central longitudinal hinge provided between adjacent (hinged) ramp kerbs, so that the ramp structure can be folded into a collapsed configuration for storage. FIG. 4 shows an example of a foldable ramp structure 400, with the adjacent ramp kerbs attached to each other by hinge 406, the hinge 406 formed by pivotal attachment of two adjacent hinge leaves. The hinge in the pictured embodiment is a 3-part hinge, with an aluminium/polymer extruded pin connecting the two hinge leaves.

As is clear from FIG. 2c, the transverse edges of the ramp surface 202 substantially align with the transverse edges of the ramp lip extension 300. Moreover, the uppermost lateral end of the inclined surface 302 of the ramp lip extension 300 aligns with the ramp surface 202 when the ramp 200 is assembled.

Ramp surface 202 is supported at its transverse edges by the two individual ramp kerbs 204a and 204b. Similarly, the ridge-like projection 306 of the ramp lip extension 300 is supported in the second longitudinally extending channels of the first ramp kerb 204a and second ramp kerb 204b at its transverse edges.

Figure 3:
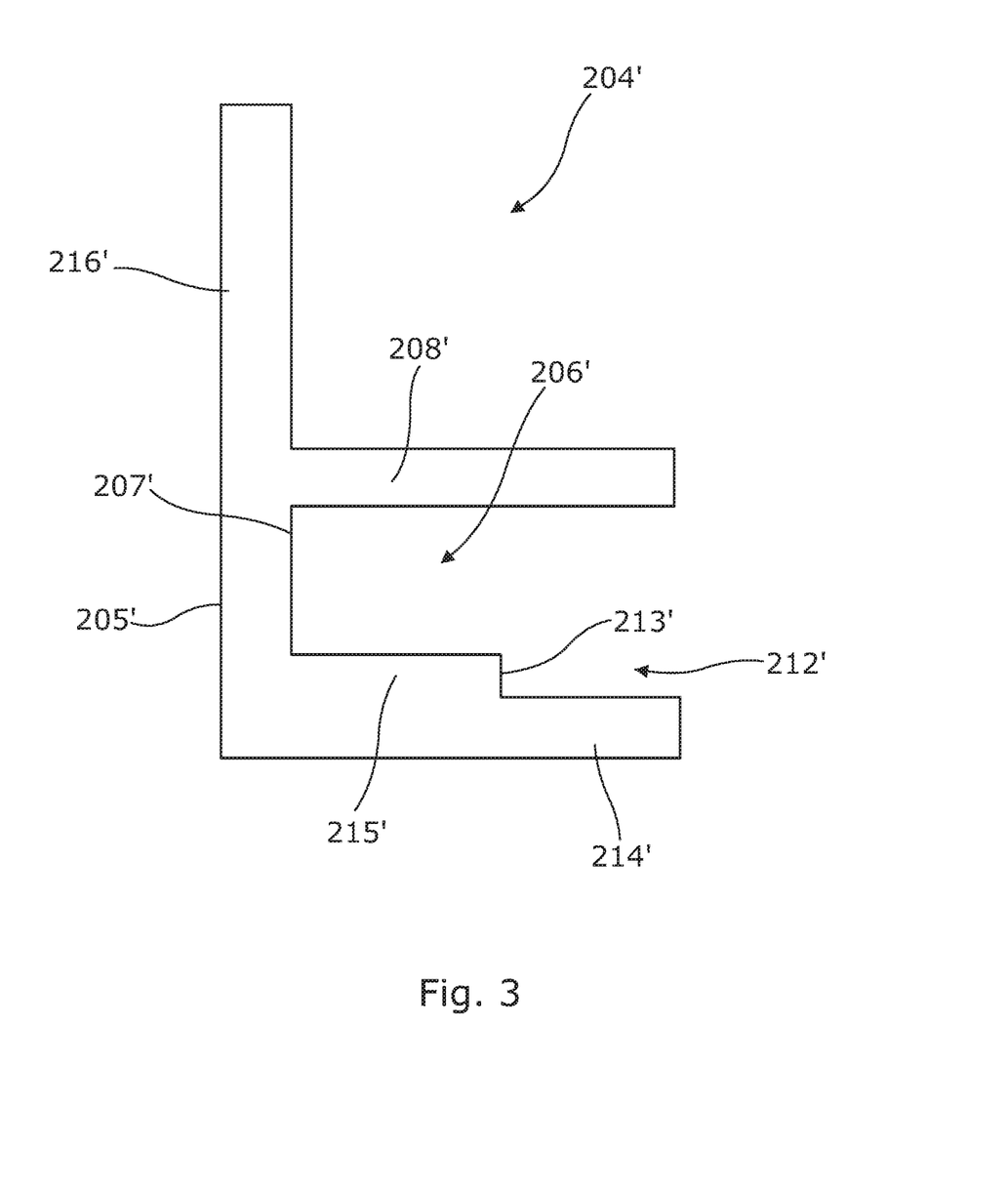

FIGS. 3 and 4 show two alternative embodiments of a ramp kerb, each having first longitudinally extending channel for receiving a ramp surface 202 (not shown), and a longitudinally extending channel for receiving a ramp lip extension 300 (not shown).

Ramp kerb 204' of FIG. 3 includes a longitudinally extending spine 205', longitudinally extending upstanding rail 216', upper web 208', and lower web 214'. Unlike the embodiment of FIG. 2a, the ramp kerb 204' of FIG. 3 does not have a central web. Instead, the first longitudinally extending channel 206' and second longitudinally extending channel 212' are joined and both positioned between the upper and lower webs 208', 214'.

The base 207' of the first longitudinally extending channel 206' is recessed from the base 213' of the second longitudinally extending channel 206'. This is achieved by a step 215' provided adjacent the lower web 214'. The step 215' provides the effective base of the second longitudinally extending channel 212'. Accordingly, the ramp kerb of FIG. 3 is configured to receive a ramp surface with a greater lateral dimension (width) than the ramp lip extension.

Upper and lower webs 208', 214' have the same lateral dimension (width). Accordingly, the inner transverse edges of the first and second longitudinally extending channels 212', 206' are effectively aligned.

Ramp kerb 204" of FIG. 4 includes a longitudinally extending spine 205", longitudinally extending upstanding rail 216", upper web 208", lower web 214", and central web 210". The upper and central webs 208", 210" define the first longitudinally extending channel 206". The lower and central webs 214", 210" define the second longitudinally extending channel 212". As shown in FIG. 4, the base 213" of the second longitudinally extending channel 212" is offset from the base 207" of the second longitudinally extending channel 206". Moreover, the base 213" of the second longitudinally extending channel 212" is recessed relative to the base 207" of the first longitudinally extending channel 206", so as to accommodate a ramp lip extension with a greater lateral dimension (width) than the ramp surface.

Upper and central webs 208" and 210" have the same lateral dimension (width). Lower web 214" is shorter (less wide) than upper and central webs 208" and 210", such that the inner transverse edge of the second longitudinally extending channel 212" is recessed relative to the inner transverse edge of the first longitudinally extending channel 206".

Figures 5A, 5B:
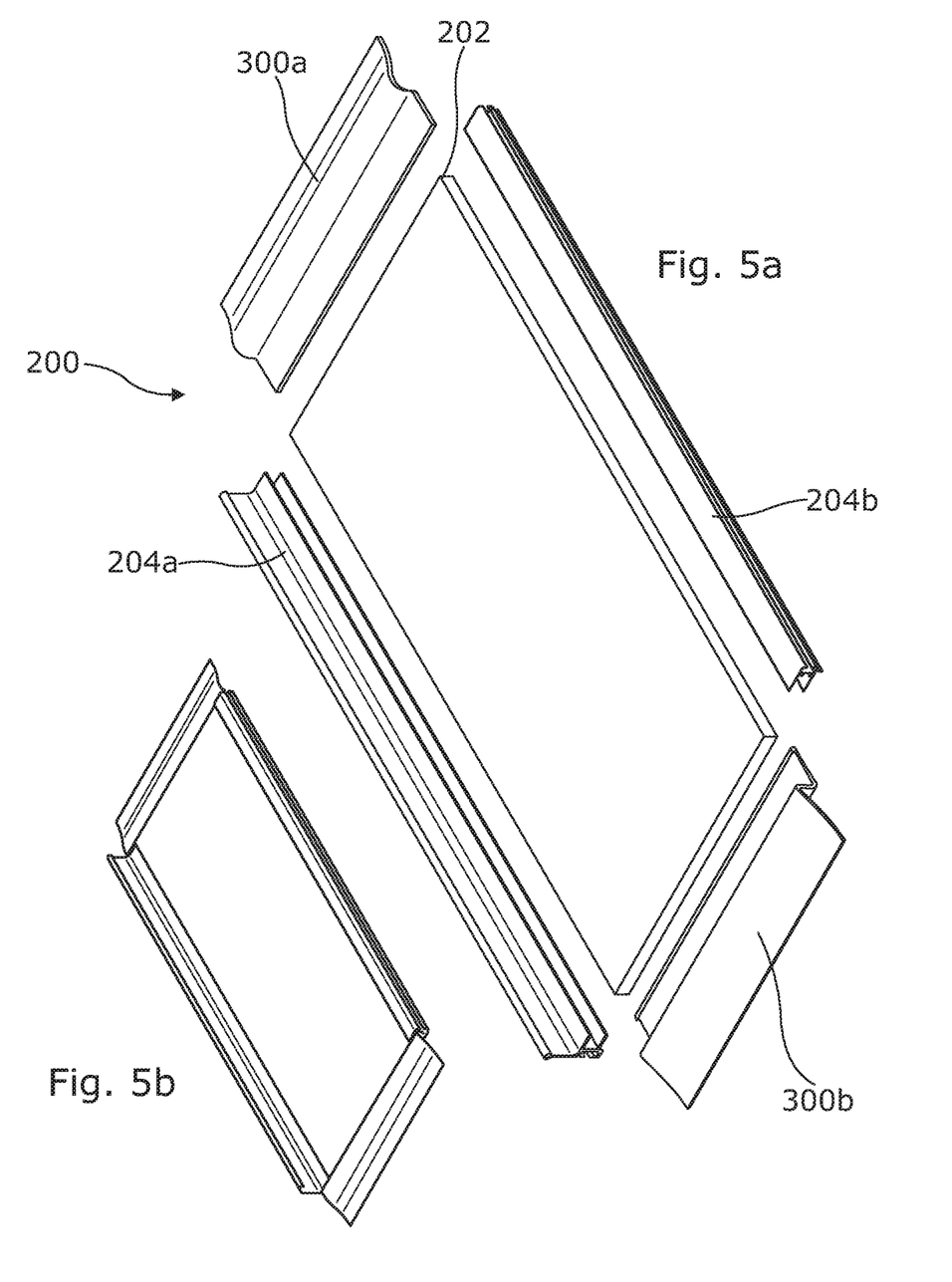

FIG. 5a shows an expanded view of a ramp structure 200 according to an embodiment of the present invention. Ramp structure 200 includes ramp surface 202, ramp kerbs 204a, 204b, and further includes ramp lip extensions 300a, 300b (one at each lateral end of the ramp/ramp surface).

FIG. 5b shows the ramp structure 200 of FIG. 3a, once assembled.

Figure 6:
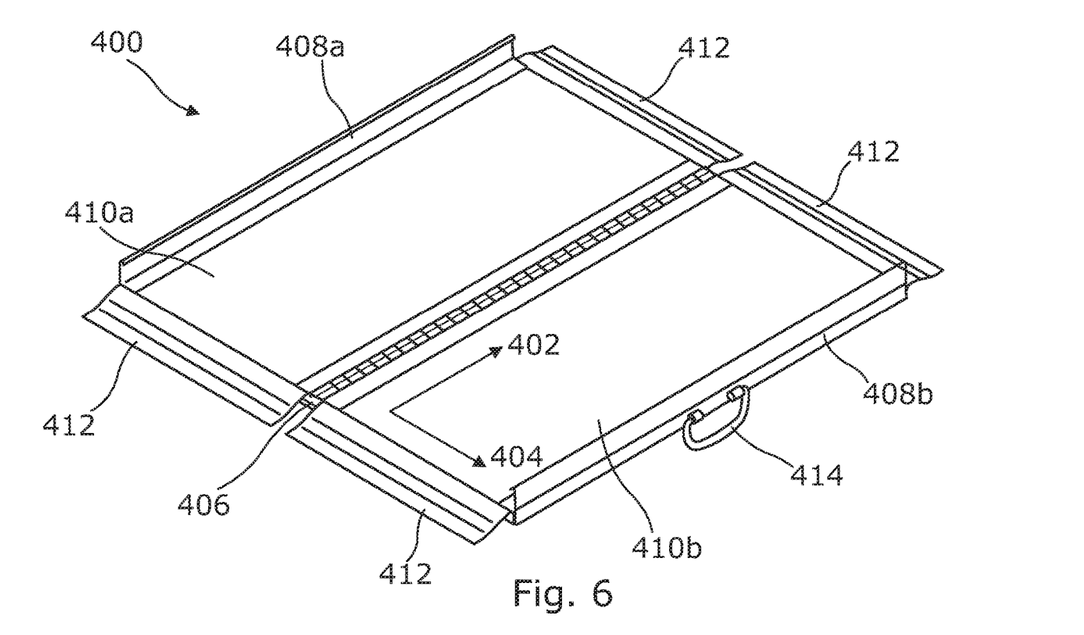
FIG. 6 shows a perspective view of a foldable ramp structure according to an embodiment of the present invention, in an unfolded configuration.
Figure 8:
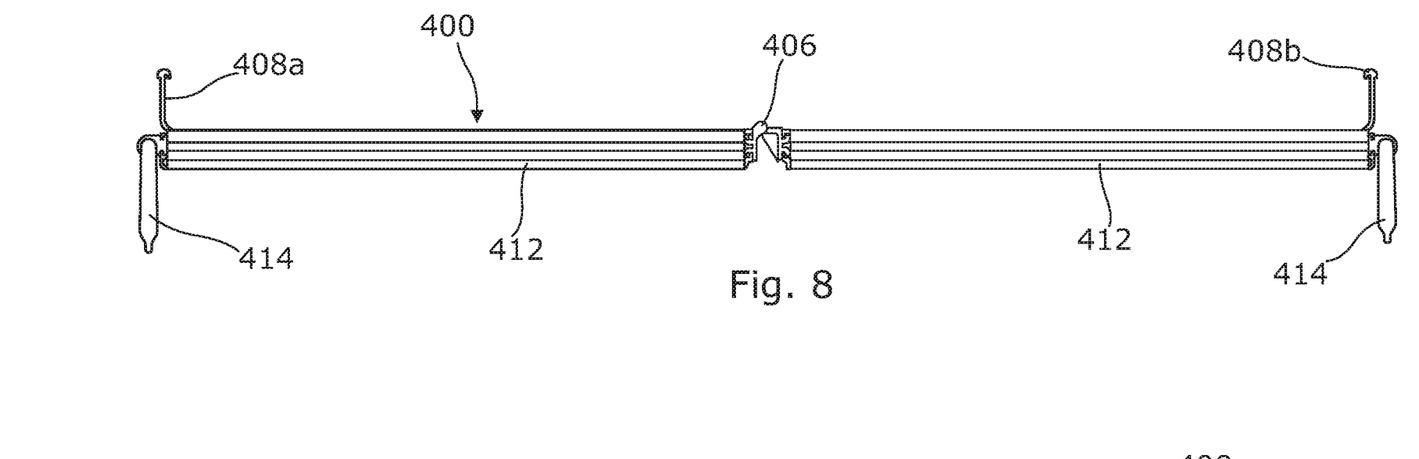
FIG. 8 shows an end-view of the foldable ramp of FIG. 6, in the unfolded configuration.

FIGS. 6 and 8 show a foldable ramp structure 400, in an unfolded configuration ready for use e.g. by a wheelchair user. Shown on FIG. 6 is the longitudinal direction 402, and the transverse direction 404.

The adjacent ramp kerbs of the ramp 400 each include a longitudinally extending hinge leaf. The two hinge leaves are joined to form a barrel hinge 406, such that the ramp structure is foldable about its longitudinal centre-line. The foldable ramp structure further comprises outer ramp kerbs 408a, 408b on the opposing transverse of each ramp surface 410a, 410b from the hinge 406. Outer ramp kerbs 408a, 408b each include an upstanding rail as a safety feature. A ramp lip extension 412 is positioned at each lateral end of each ramp surface.

Figure 7:
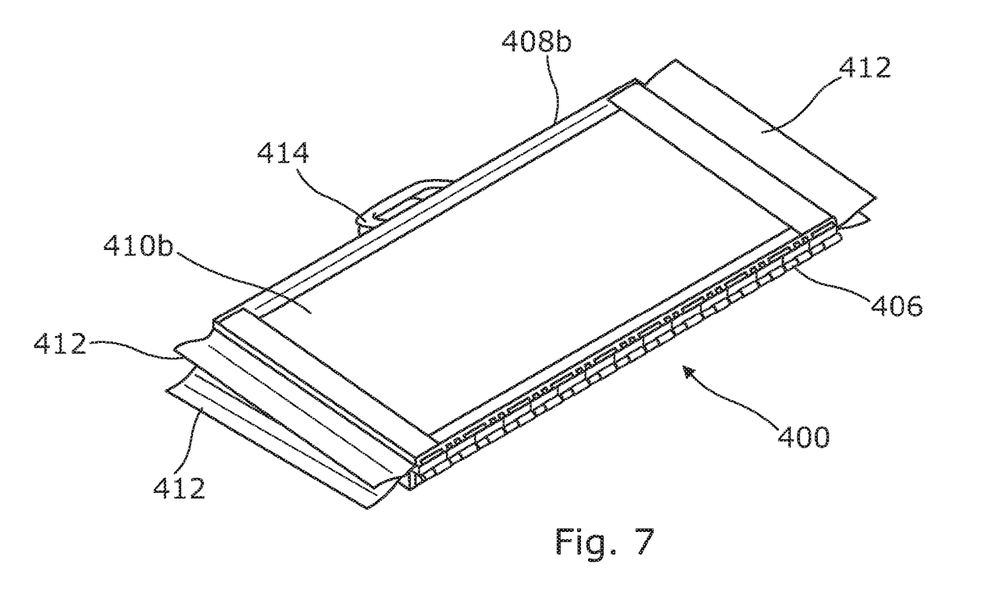
FIG. 7 shows the foldable ramp of FIG. 6, in a folded configuration.
Figure 9:
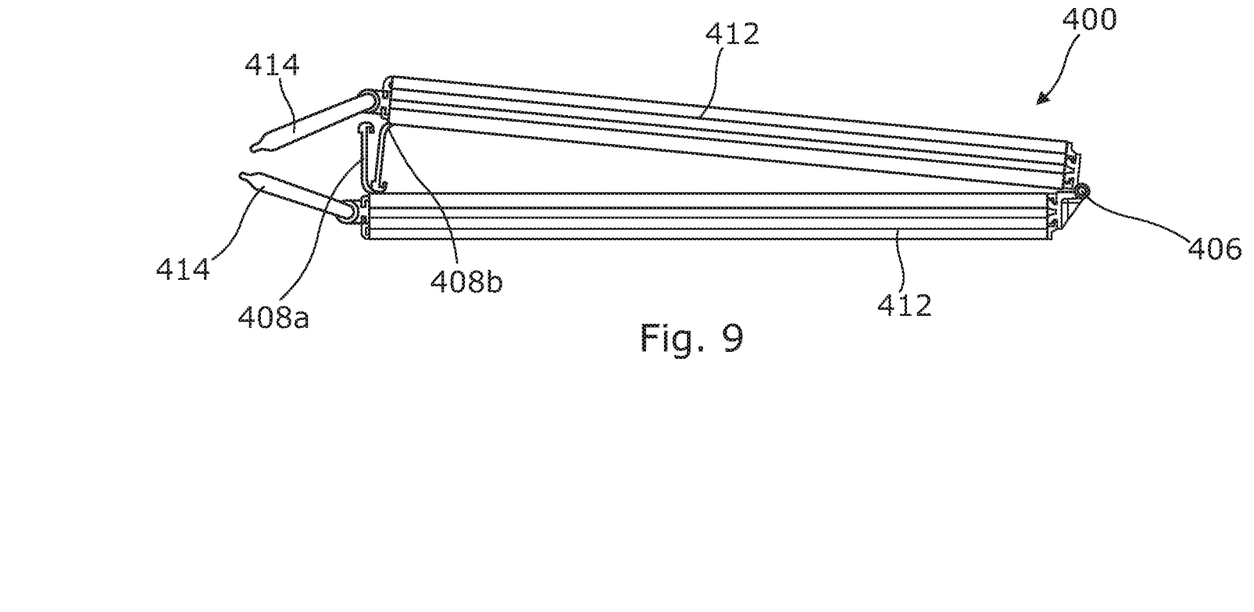
FIG. 9 shows an end-view of the foldable ramp of FIG. 6, in the folded configuration.

The ramp surfaces can be folded by 180° with respect to each other, about the hinge 406, for storage. When in the storage configuration (FIGS. 7 and 9), the ramp structure can be carried by handles 414 on the ramp kerbs 408a, 408b.

Although not visible in FIG. 5, attachment of the ramp surfaces 410a, 410b and ramp lip extensions 412 to the ramp kerbs 408a, 408b is by the same interference fit and/or interlocking engagement as described in the embodiments of FIGS. 2 to 5.

Figure 10:
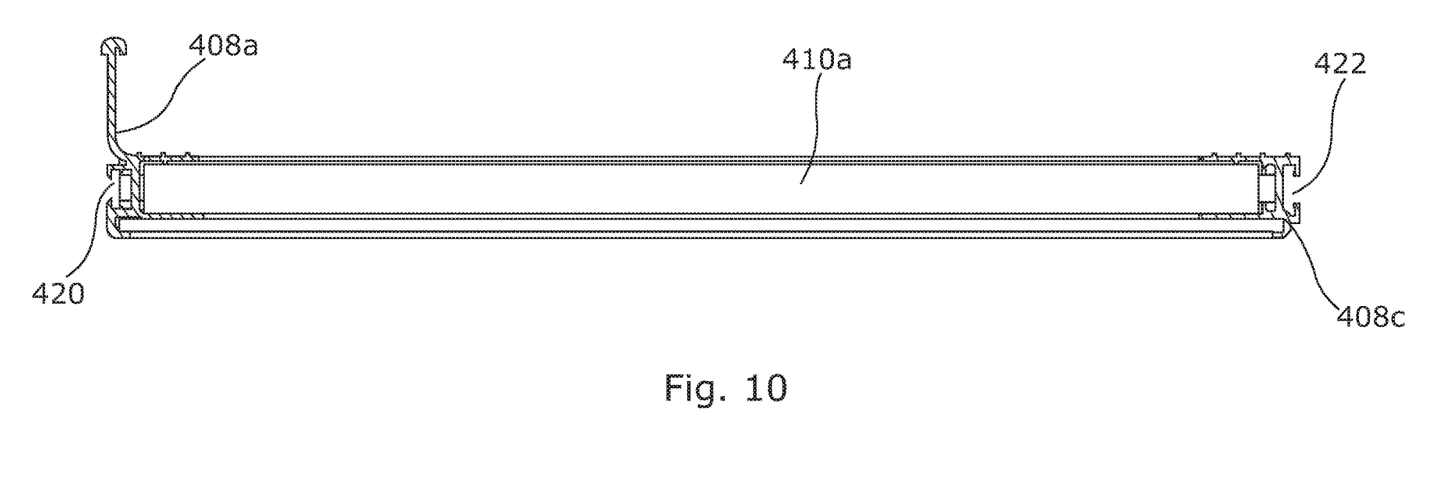
FIG. 10 shows an end-view of an assembled ramp surface and ramp kerbs according to an embodiment of the invention.

FIG. 10 shows a ramp surface 410a, ramp kerb 408a and ramp kerb 408c of ramp 400. Ramp kerb 408a includes a first slot 420 for receiving handle 414 (not shown). Ramp kerb 408c includes a second slot 422 for receiving a hinge leaf (not shown).

Figure 11:
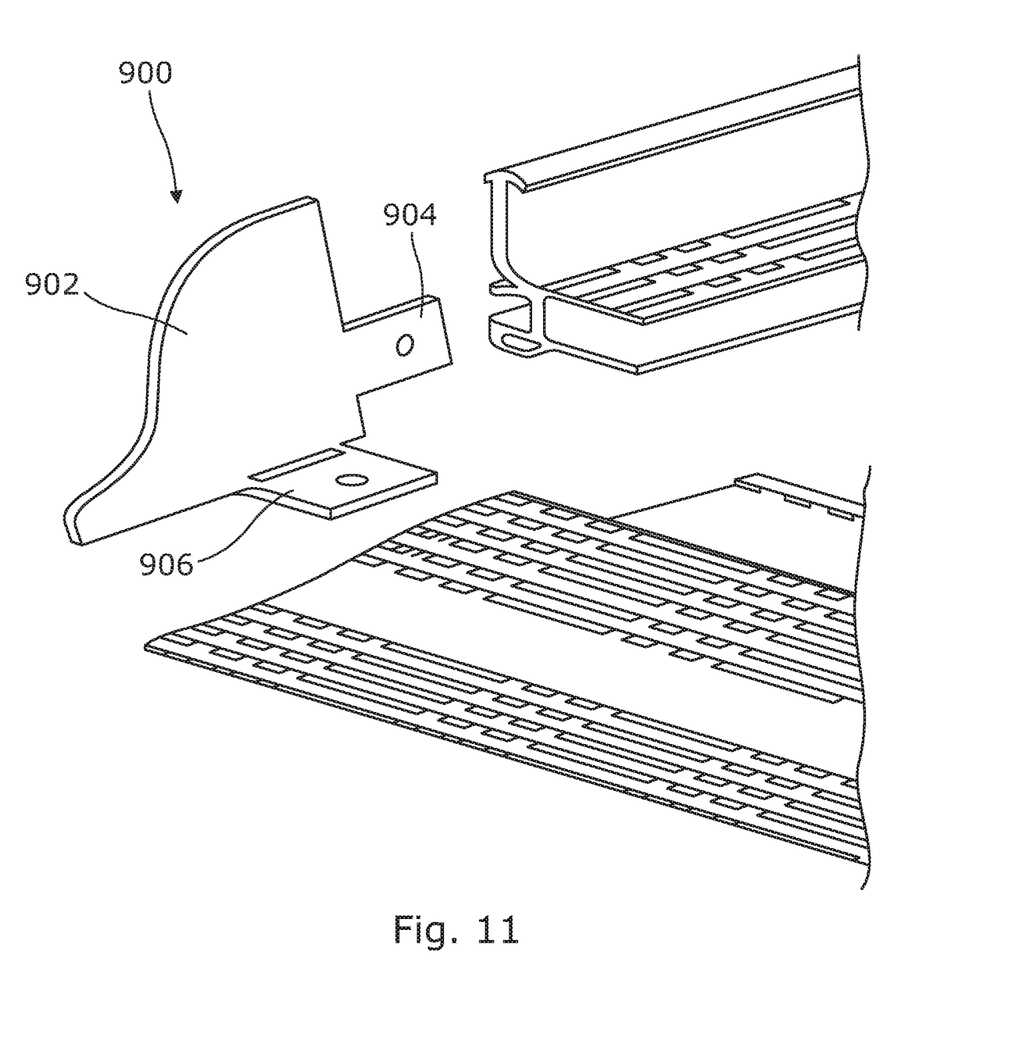
FIG. 11 shows a perspective view of a transverse edge-support element for use in embodiments of the present invention.

FIG. 11 shows a transverse edge-support element 900, which may be attached to a ramp kerb and ramp lip extension of any of the above embodiments. The transverse edge-support element 900 includes a vertical plate portion 902, for providing structural support and rigidity to the connection between the ramp kerb and the ramp lip extension. The edge-support element also includes a first attachment tab 904 for attachment to the ramp kerb, and a second attachment tab 906 for attachment to the ramp lip extension. As shown, tab 904 is vertically aligned (i.e. co-aligned with the vertical plate portion 902), for attachment to an outer transverse surface of the lateral end of the ramp kerb. Tab 906 is horizontally aligned (i.e. bent 90° with respect to the vertical plate portion 902), so as to attach to an underside of the ramp lip extension, at an outer transverse edge of the ramp lip extension. The tabs include openings for receiving a screw, bolt, or rivet. Corresponding openings (not shown) are provided on the ramp kerb and ramp lip extension, for attachment of the transverse edge-support element thereto.

The ramp surface/panel in the embodiments discussed above is an aluminium panel, with a honeycomb internal structure, and a roughened upper surface. Aluminium honeycomb is lightweight, and strong, and therefore perfectly suited for portable access ramps. The ramp kerbs and ramp lip extensions are also aluminium, but do not have an internal honeycomb structure. The ramp kerbs and ramp lip extensions are each formed by a single-step extrusion process, which is inexpensive.

The above embodiments have been described by way of example. Modifications of the above embodiments will be apparent to skilled persons on reading this disclosure and as such are within the spirit and scope of the invention.

The invention claimed is:

1. A ramp structure, the ramp structure comprising:
    a first ramp kerb;
    a second ramp;
    each of the first and the second ramp kerbs comprising a first longitudinally extending channel open at an inner transverse edge of the ramp kerb and a second longitudinally extending channel open at the inner transverse edge of the ramp kerb, wherein said first and second longitudinally extending channels are vertically spaced;

a ramp surface having transverse edges spaced by an uppermost lateral edge and a lowermost lateral edge, a first of the transverse edges of the ramp surface being received in the first longitudinally extending channel of the first ramp kerb, and a second of the transverse edges of the ramp surface being received in the first longitudinally extending channel of the second ramp kerb;

first and second ramp lip extensions, each of the first and second ramp lip extensions comprising a lip surface having transverse edges spaced by an uppermost lateral end and a lowermost lateral end, and an attachment portion comprising a downwardly depending skirt depending from the uppermost lateral end of the lip surface and at least one projection projecting from said skirt away from said lip surface, wherein said at least one projection is vertically spaced below said uppermost lateral end of the lip surface by said skirt;

wherein the at least one projection of the first ramp lip extension is received in the second longitudinally extending channels of the first and second ramp kerbs, such that the uppermost lateral end of the lip surface of the first ramp lip extension is in abutment with the lowermost lateral end of the ramp surface; and wherein the at least one projection of the second ramp lip extension is received in the second longitudinally extending channels of the first and second ramp kerbs, such that the uppermost lateral end of the lip surface of the second ramp lip extension is in abutment with the uppermost lateral end of the ramp surface.

2. The ramp structure of claim 1, wherein the at least one projection of each ramp lip extension is configured to be received in the second longitudinally extending channels by an interference fit.

3. The ramp structure of claim 1, wherein the transverse edges of the ramp surface are configured to be received in the first longitudinally extending channels of the first and second ramp kerbs by an interference fit.

4. The ramp structure of claim 1, further comprising:
third and fourth ramp kerbs, each of the third and four ramp kerbs comprising a first longitudinally extending channel open at an inner transverse edge of the ramp kerb and a second longitudinally extending channel open at the inner transverse edge of the ramp kerb, wherein said first and second longitudinally extending channels are vertically spaced; the third ramp kerb having a hinge leaf for pivotal attachment to a hinge leaf of the second ramp kerb;

a further ramp surface having transverse edges spaced by an uppermost lateral end and a lowermost lateral end, a first of the transverse edges of the further ramp surface being received in the first longitudinally extending channel of the third ramp kerb, and a second of the transverse edges of the further ramp surface being received in the first longitudinally extending channel of the fourth ramp kerb; and a third ramp lip extension comprising a lip surface having transverse edges spaced by an uppermost lateral end and a lowermost lateral end, and an attachment portion comprising a downwardly depending skirt depending from the uppermost lateral end of the lip surface and at least one projection projecting from said skirt away from said lip surface, wherein said at least one projection is vertically spaced below said uppermost lateral end of the lip surface by said skirt, and wherein the at least one projection of the third ramp lip extension is received in the second longitudinally extending channels of the third and fourth ramp kerbs, such that the uppermost lateral end of the lip surface of the third ramp lip extension is in abutment with the lowermost lateral end of the further ramp surface.

5. The ramp structure of claim 4, further comprising a fourth ramp lip extension comprising a lip surface having transverse edges spaced by an uppermost lateral end and a lowermost lateral end, and an attachment portion comprising a downwardly depending skirt depending from the uppermost lateral end of the lip surface and at least one projection projecting from said skirt away from said lip surface, wherein said at least one projection is vertically spaced below said uppermost lateral end of the lip surface by said skirt, and wherein the at least one projection of the fourth ramp lip extension is received in the second longitudinally extending channels of the first and second ramp kerbs, such that the uppermost lateral end of the lip surface of the fourth ramp lip extension is in abutment with the uppermost most lateral end of the ramp surface.

6. The ramp structure of claim 4, wherein the first and fourth ramp kerbs of the ramp structure each comprise a longitudinally extending upstanding rail.

7. The ramp structure of claim 1 wherein each ramp kerb further comprises a longitudinally extending spine at an outer transverse edge of the ramp kerb, the longitudinally extending spine providing a base of the first longitudinally extending channel and a base of the second longitudinally extending channel.

8. The ramp structure of claim 7, wherein the base of the first longitudinally extending channel of each ramp kerb is coaligned with the base of the second longitudinally extending channel of the ramp kerb.

9. The ramp structure of claim 7, wherein the base of the first longitudinally extending channel of each ramp kerb is recessed relative to the base of the second longitudinally extending channel of the ramp kerb.

10. The ramp structure of claim 1, wherein the first and second longitudinally extending channels of each ramp kerb are separated by an elongated central web, the central web providing the upper surface of the second longitudinally extending channel and the lower surface of the first longitudinally extending channel of the ramp kerb.

11. The ramp structure of claim 1, wherein each ramp kerb comprises a longitudinally extending upstanding rail providing a safety barrier at the outer transverse edge of the ramp kerb.

12. The ramp structure of claim 1, wherein an upper and/or lower surface defining the first longitudinally extending channel of each ramp kerb comprises at least one projection.

13. The ramp structure of claim 1, wherein the at least one projection of each ramp lip extension is vertically spaced above a lowermost edge of the downwardly depending skirt of the ramp lip extension.

14. The ramp structure of claim 1, wherein the at least one projection of each ramp lip extension projects perpendicularly out of the skirt of the ramp lip extension.

15. The ramp structure of claim 1, wherein the downwardly depending skirt of each ramp lip extension extends from one transverse edge of the ramp lip extension to an opposing transverse edge of the ramp lip extension.

16. The ramp structure of claim 1, wherein the projection of each ramp lip extension is a single ridge-like projection extending from one transverse edge of the ramp lip extension to the opposing transverse edge of the ramp lip extension.

17. The ramp structure of claim 1, wherein the attachment portion of each ramp lip extension is configured such that the lip surface forms an oblique angle with respect to the ramp kerbs.

\* \* \* \* \*